United States Patent
Son et al.

(10) Patent No.: US 9,762,934 B2
(45) Date of Patent: Sep. 12, 2017

(54) APPARATUS AND METHOD FOR VERIFYING BROADCAST CONTENT OBJECT IDENTIFICATION BASED ON WEB DATA

(71) Applicant: Electronics and Telecommunications Research Institute, Daejeon-si (KR)

(72) Inventors: Jeong Woo Son, Daejeon-si (KR); Kee Seong Cho, Daejeon-si (KR); Sun Joong Kim, Sejong-si (KR); Hwa Suk Kim, Daejeon-si (KR); So Yung Park, Daejeon-si (KR); Won Il Chang, Seoul (KR); Kyong Ha Lee, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 117 days.

(21) Appl. No.: 14/932,426

(22) Filed: Nov. 4, 2015

(65) Prior Publication Data
US 2016/0127750 A1    May 5, 2016

(30) Foreign Application Priority Data

Nov. 4, 2014 (KR) .................. 10-2014-0152315
Aug. 20, 2015 (KR) .................. 10-2015-0117556

(51) Int. Cl.
G06K 9/00 (2006.01)
H04N 21/234 (2011.01)
(Continued)

(52) U.S. Cl.
CPC .......... *H04N 21/23418* (2013.01); *G06F 17/30864* (2013.01); *H04N 21/237* (2013.01);
(Continued)

(58) Field of Classification Search
CPC ......... H04N 21/23418; H04N 21/2335; H04N 21/251; H04N 21/8133; H04N 21/8405;
(Continued)

(56) References Cited

U.S. PATENT DOCUMENTS 6,507,764 B1 * 1/2003 Parrella .................. G06Q 10/06
348/E7.063
7,047,305 B1 * 5/2006 Brooks ............. H04L 29/06027
348/207.99
(Continued)

FOREIGN PATENT DOCUMENTS

KR     10-0958302     5/2010
KR     10-2013-0060299     6/2013
(Continued)

*Primary Examiner* — Amir Alavi
(74) *Attorney, Agent, or Firm* — Kile Park Reed & Houtteman PLLC (57) ABSTRACT

An apparatus and method for verifying broadcast content object identification based on web data. The apparatus includes: a web data processor configured to collect and process web data related to broadcast content and create content knowledge information by tagging the web data to the broadcast content; a content knowledge information storage portion configured to store the content knowledge information; and an object identification verifier configured to verify a result of identifying an object contained in the broadcast content, using the content knowledge information.

16 Claims, 7 Drawing Sheets

(51) Int. Cl.

| | | |
|---|---|---|
| *H04N 21/235* | (2011.01) | |
| *H04N 21/25* | (2011.01) | |
| *H04N 21/81* | (2011.01) | |
| *G06F 17/30* | (2006.01) | |
| *H04N 21/8405* | (2011.01) | |
| *H04N 21/845* | (2011.01) | |
| *H04N 21/231* | (2011.01) | |
| *H04N 21/2343* | (2011.01) | |
| *H04N 21/237* | (2011.01) | |
| *H04N 21/462* | (2011.01) | |
| *H04N 21/472* | (2011.01) | |
| *H04N 21/4722* | (2011.01) | |
| *H04N 21/4728* | (2011.01) | |
| *H04N 21/482* | (2011.01) | |
| *H04N 21/61* | (2011.01) | |

(52) U.S. Cl.
CPC ... *H04N 21/2353* (2013.01); *H04N 21/23109* (2013.01); *H04N 21/234318* (2013.01); *H04N 21/251* (2013.01); *H04N 21/4622* (2013.01); *H04N 21/4722* (2013.01); *H04N 21/4728* (2013.01); *H04N 21/47205* (2013.01); *H04N 21/4828* (2013.01); *H04N 21/6125* (2013.01); *H04N 21/8133* (2013.01); *H04N 21/8405* (2013.01); *H04N 21/8455* (2013.01)

(58) Field of Classification Search
CPC ............... H04N 21/8455; G11B 27/28; G06F 17/30864; G06K 9/4609; G06K 9/48; G06T 7/0083; G06T 2207/10016
See application file for complete search history.

(56) References Cited

U.S. PATENT DOCUMENTS

| | | | |
|---|---|---|---|
| 8,533,192 B2 | 9/2013 | Moganti et al. | |
| 2004/0103032 A1* | 5/2004 | Maggio | G06Q 30/02 705/14.2 |
| 2007/0107022 A1* | 5/2007 | Lawrence, III | H04H 60/37 725/92 |
| 2008/0229365 A1* | 9/2008 | Kim | H04H 60/06 725/56 |
| 2009/0217336 A1* | 8/2009 | Chang | H04N 7/17318 725/115 |
| 2012/0072420 A1 | 3/2012 | Moganti et al. | |
| 2013/0243307 A1 | 9/2013 | Winter et al. | |
| 2014/0211044 A1 | 7/2014 | Lee et al. | |
| 2014/0282673 A1* | 9/2014 | Neumeier | H04N 21/44008 725/19 |
| 2014/0298375 A1* | 10/2014 | Isozaki | H04N 21/25816 725/30 |
| 2014/0304597 A1 | 10/2014 | Einstein et al. | |
| 2016/0127750 A1* | 5/2016 | Son | H04N 21/23418 725/14 |
| 2016/0192029 A1* | 6/2016 | Bergstrom | H04L 43/0882 725/109 |
| 2016/0249115 A1* | 8/2016 | Lincke | H04N 21/8545 |

FOREIGN PATENT DOCUMENTS

| | | |
|---|---|---|
| KR | 10-2014-0080724 | 7/2014 |
| KR | 10-2014-0095956 | 8/2014 |

* cited by examiner

APPARATUS AND METHOD FOR VERIFYING BROADCAST CONTENT OBJECT IDENTIFICATION BASED ON WEB DATA

CROSS-REFERENCE TO RELATED APPLICATIONS

This application claims priority from Korean Patent Application Nos. 10-2014-0152315, filed on Nov. 4, 2014, and 10-2015-0117556, filed on Aug. 20, 2015, in the Korean Intellectual Property Office, the disclosures of which are incorporated herein by reference in its entirety.

BACKGROUND

1. Field

The following description relates to broadcast communication technology, and particularly, to a technology for identifying an object in broadcast content.

2. Description of the Related Art

Generally, technologies used to object identification for broadcast content relate to image processing, whereby features are extracted from a specific scene (frame) of the broadcast content and an object with the features is selected from a group of candidate objects for identification.

However, the current image processing technology only shows an average precision (AP) of 0.45, which is even decreased geometrically when the size of the group of objects to be identified increases. Hence, in a circumstance where the broadcast content contains various types of objects, such as characters, vehicles, locations, and articles and goods, an application of the image processing technology alone may not suffice when considering the commercialization of the object identification.

SUMMARY

The following description relates to an apparatus and method for verifying object identification, which are capable of verifying a result of object identification obtained by image processing, using information acquired from an external source, other than the broadcast content, and thereby increase the performance of object identification of broadcast content.

In one general aspect, there is provided an apparatus for verifying broadcast content object identification based on web data, the apparatus including: a web data processor configured to collect and process web data related to broadcast content and create content knowledge information by tagging the web data to the broadcast content; a content knowledge information storage portion configured to store the content knowledge information; and an object identification verifier configured to verify a result of identifying an object contained in the broadcast content, using the content knowledge information.

In another general aspect, there is provided a method for verifying broadcast content object identification based on web data, the method including: collecting and processing web data related to broadcast content and creating content knowledge information by tagging the processed web data to the broadcast content; and verifying a result of identifying an object contained in the broadcast content, using the content knowledge information.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, in order to facilitate understanding and reproduce by those skilled in the art, the present invention will be described in detail by explaining exemplary embodiments with reference to the accompanying drawings. When it is determined that detailed explanations of related well-known functions or configurations unnecessarily obscure the gist of the embodiments, the detailed description thereof will be omitted.

Terms described in below are selected by considering functions in the embodiment and meanings may vary depending on, for example, a user or operator's intentions or customs. Therefore, in the following embodiments, when terms are specifically defined, the meanings of terms should be interpreted based on definitions, and otherwise, should be interpreted based on general meanings recognized by those skilled in the art.

Also, although configurations of selectively described aspects or selectively described embodiments in below are illustrated as a single integrated configuration in the drawings, unless otherwise described, it should be understood that these are freely combined with each other when technological contradiction of these combinations is not apparent for those skilled in the art.

The present disclosure suggests a technology that verifies object identification obtained by image processing, using information acquired from external sources, other than broadcast content. Broadcast content is delivered to a large number of audiences more promptly, compared to general videos or images, and the relevant content is frequently reproduced by the users. For example, in case of a South Korean television serial "My Love from the Star," more than 40,000 relevant blog posts were generated during about a three-month period for which the show was aired.

Hence, based on the observation that web data associated with broadcast content contains wide range of information about the broadcast content and its size is massive, the present invention utilizes information extracted from the web data in order to verify object identification.

Figure 1:
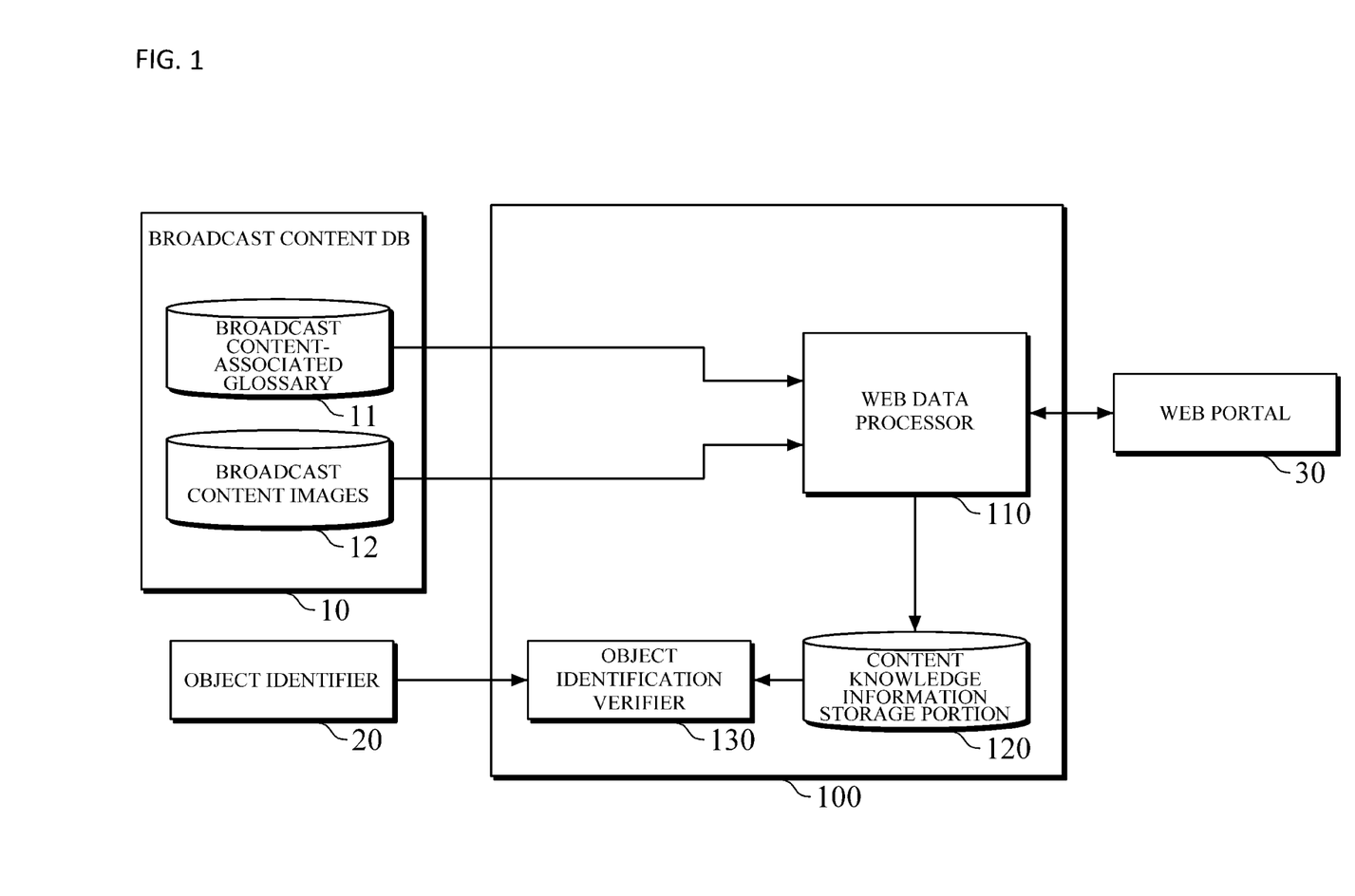
FIG. 1 is a diagram illustrating an apparatus for verifying identification of a broadcast content object based on web data, according to an exemplary embodiment.

FIG. 1 is a diagram illustrating an apparatus for verifying identification of a broadcast content object, based on web data, according to an exemplary embodiment.

Referring to FIG. 1, the apparatus 100 includes a web data processor 110, a content knowledge information storage portion 120, and an object identification verifier 130. The web data processor 110 collects and processes web data related to broadcast content, and generates content knowledge information by tagging the broadcast content. The content knowledge information storage portion 120 stores content knowledge information, and the object identification verifier 130 verifies the identification of an object contained in the broadcast content, using the content knowledge information.

A broadcast content database (DB) 10 includes a broadcast content-associated glossary 11 and broadcast content images 12. The broadcast content DB 10 may be stored in a server of a broadcasting company, and it may be provided in various forms. The broadcast content DB 10 provides information related to broadcast content to the web data processor 110, so that the web data processor 110 can create data to be used in verifying object identification by an object identifier 20.

The object identifier 20 identifies an object in a broadcast content image, using an image recognition technology. The object identification is verified by the object identification verifier 130.

Figure 2:
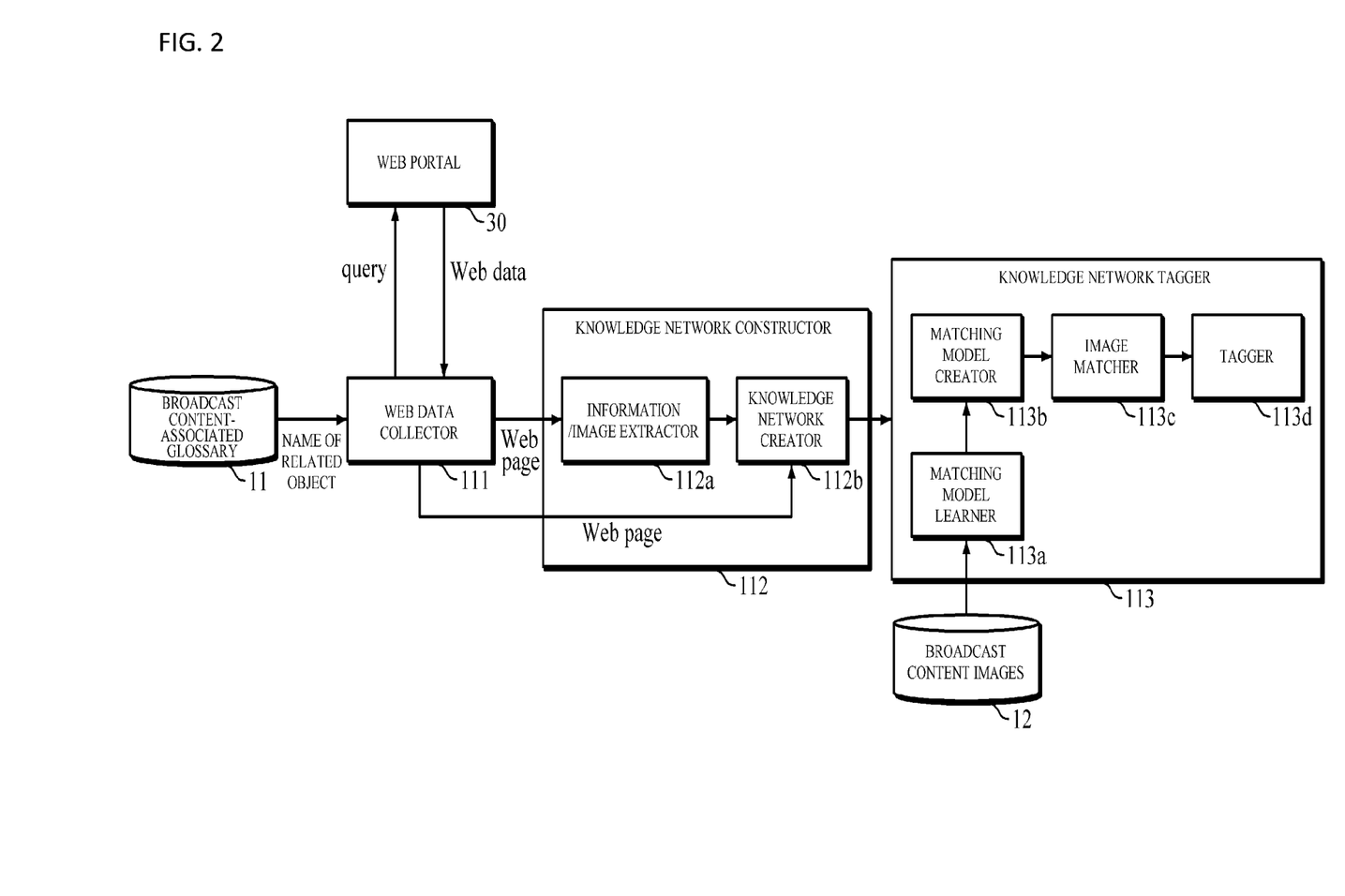
FIG. 2 is a block diagram illustrating a web data processor according to an exemplary embodiment.

FIG. 2 is a block diagram illustrating a web data processor according to an exemplary embodiment.

Referring to FIG. 2, the web data processor 110 includes, specifically, a web data collector 111, a knowledge network constructor 112, and a knowledge network tagger 113.

The web data collector 111 collects web data, using keywords relevant to an object. To this end, the web data collector 111 searches the broadcast content-associated glossary 11 to obtain keywords needed for collecting web data, creates a query by combining the obtained keywords, accesses a web portal 30, and searches for and collects web data using the created query. Here, the object-relevant keywords may include, for example, the title of content, a main character's name, the name of vehicle shown as product placement (PPL), or the name of location.

The knowledge network constructor 112 constructs a knowledge network consisting of at least one of terms and images extracted from the collected web data. The knowledge network constructor 112 includes, specifically, an information/image extractor 112a and a knowledge network creator 112b. The information/image extractor 112a extracts the terms and images from the web data (i.e., a web page). The knowledge network creator 112b forms a knowledge network consisting of nodes that are the terms and images extracted by the information/image extractor 112a. The knowledge network will be described in detail with reference to FIG. 3.

The knowledge network tagger 113 searches the broadcast content image to find a frame that contains an image which matches the image contained in the knowledge network, and tags the knowledge network to the found frame. The knowledge network tagger 113 includes, specifically, a matching model learner 113a, a matching model creator 113b, an image matcher 113c, and a tagger 113d.

The matching model learner 113a is trained to achieve a matching model on the basis of frames that form a broadcast content image 12, which is stored in the broadcast content DB 10, and the matching model creator 113b stores the trained matching model.

The image matcher 113c transforms feature vectors X into X', wherein the feature vectors X are extracted from the broadcast content frame or the web images using the matching model, and measures similarity between the transformed vectors. At this time, the transformation of the feature vectors is carried out in such a manner that the similarity between broadcast content frames satisfies Equation 1 below as much as possible.

$$\text{sim}(x',y') \leq \text{sim}(x',y'), \text{ if } |(\#x-\#y)| \geq |(\#x-\#z)|, \text{ for } x,y,z \text{ in } X' \quad (1)$$

In Equation 1, sim( ) denotes a similarity calculation function, and #x denotes a frame number of x. The matching model that satisfies Equation 1 is learned in such a manner that the closer to each other the frames are, the more the similarity increases.

In one exemplary embodiment, the image matcher 113c re-computes ranks of feature vectors to match, using a different feature extraction method from the previous feature extraction method used to build the feature vectors X. For example, if color information is used to extract feature vectors X, information about texture or boundaries of the images are used in the post-processing to build feature vectors Y, and the similarity of the feature vectors is computed, whereby n candidate objects obtained from the matching model have their ranks re-adjusted. Various linear, non-linear model learning methods, such as SVMRank, manifold learning, and the like, may be applied to the establishment of matching model, and various feature extraction technologies may be used to extract features for the post-processing.

The image matcher 113c matches n frames with respect to one web image.

For the final tagging based on the matching result, the tagger 113d may select one final frame of the highest score from among the n frames, tag the knowledge network to m frames preceding and following the final frame, and then assign weights to the m frames based on their distance to the final frame.

The matching result and the knowledge network constructed by the knowledge network constructor 112 are combined with each other and the result is stored in the content knowledge information storage portion 120. For example, the content knowledge information may be C=(g1, t1), (g2,t2), (g3,t3), . . . , and (gm,tm) which is the combination of a set of knowledge networks, G=g1, g2, g3, . . . , and gm, and a set of distributions of frame numbers T=t1, t2, t3, . . . , and tm.

Figure 3:
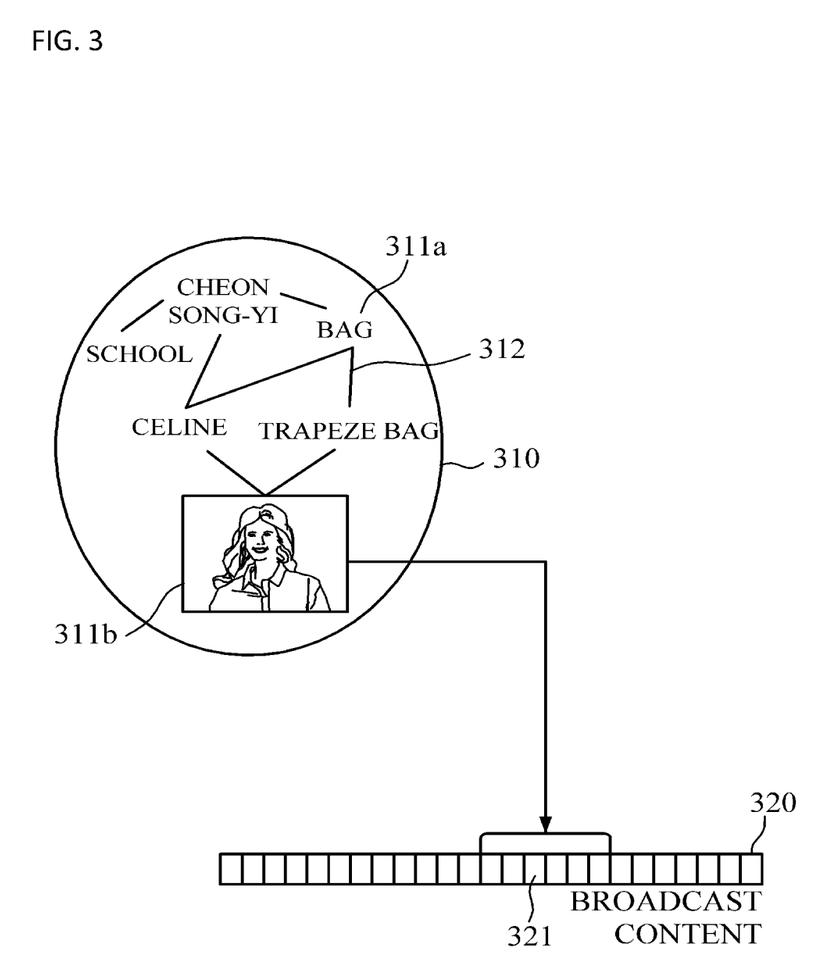
FIG. 3 is a diagram illustrating an example of tagging a knowledge network to broadcast content.

FIG. 3 is a diagram for explaining how to tag a knowledge network to broadcast content.

Referring to FIG. 3, the knowledge network G 310 consists of a plurality of nodes N 311a and 311b and edges E 312 that connect the nodes. Here, each node N is a set of words 311a and images 311b that are extracted from collected web data. The edges E are formed based on the importance of information that corresponds to each node N in the web page and relevance between the information. The images 311b contained in the knowledge network 310 may be matched with the frames 321 that form a broadcast content image 320.

Figure 4:
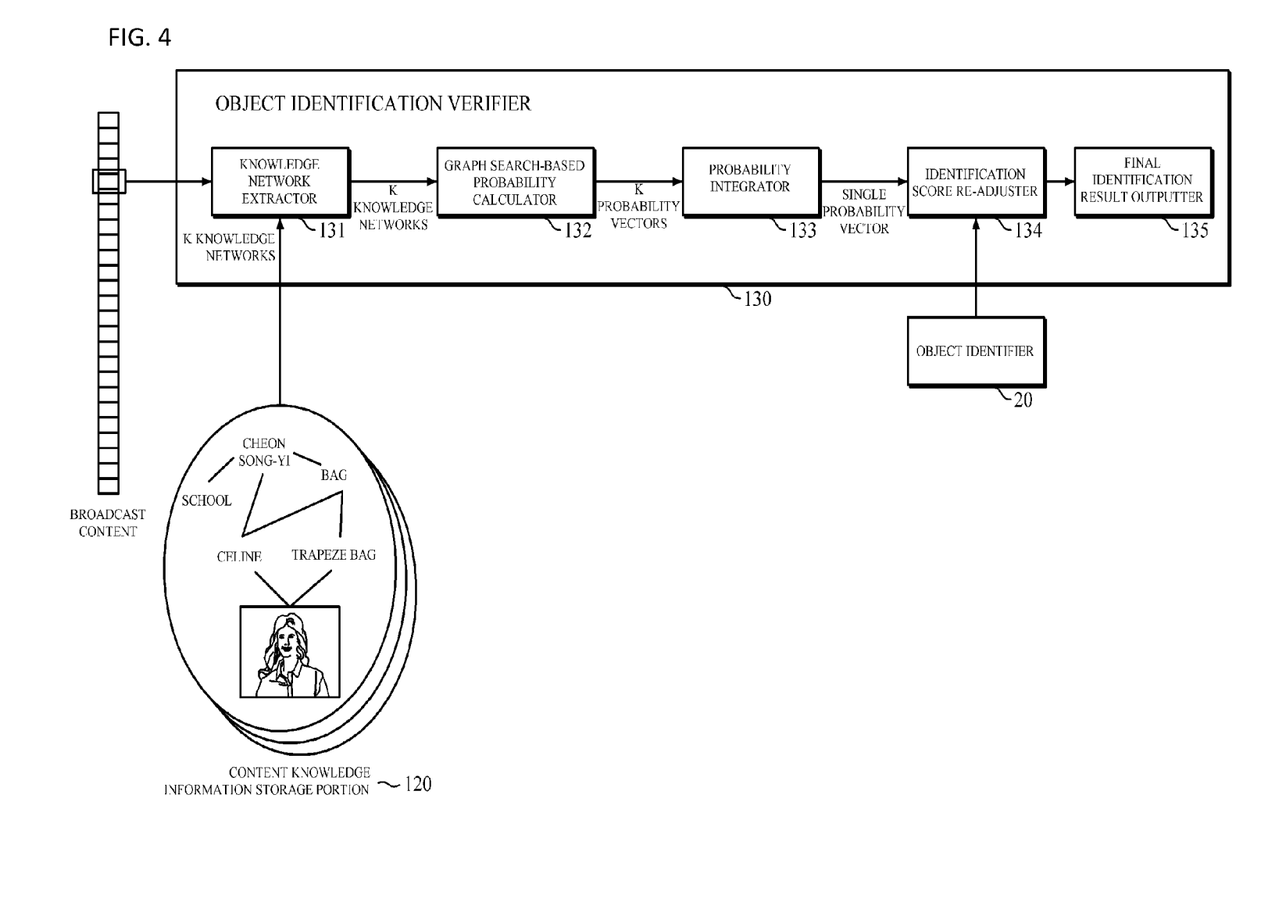
FIG. 4 is a diagram illustrating an object identification verifier according to an exemplary embodiment.

FIG. 4 is a diagram illustrating an object identification verifier according to an exemplary embodiment.

Referring to FIG. 4, the object identification verifier 130 includes, specifically, a knowledge network extractor 131, a graph search-based probability calculator 132, a probability integrator 133, an identification score re-adjuster 134, and a final identification result outputter 135.

In response to receiving a result of object identification, the knowledge network extractor 131 requests the content knowledge information storage portion 120 to send a set of knowledge networks C'⊂C associated with the object-identified frame.

The graph search-based probability calculator 132 calculates the appearance probability of an object based on a group O of candidate objects for identification and the set C' of the knowledge networks. With respect to an object o∈O to be identified, the appearance probability is calculated using Equation 2 as below.

$$\sum_{c \in C'} p(o|c) = \sum_{c \in C'} p(o|g_c) \cdot p(\#f|t_c),  \quad (2)$$

where #f denotes a frame number of the frame in which the object identification has been performed. The probability of an object o appearing in a knowledge network $g_c$ belonging to C' is multiplied with a weight of the frame #f in each knowledge network. Such multiplication is performed for all c∈C'.

The probability integrator 133 computes the probability of an object o by summing the appearance probabilities calculated by the graph search-based probability calculator 132.

The identification score re-adjuster 134 re-adjusts the result of object identification from the object identifier 20 using the obtained probability of the object o, and performs identification verification.

Figure 5:
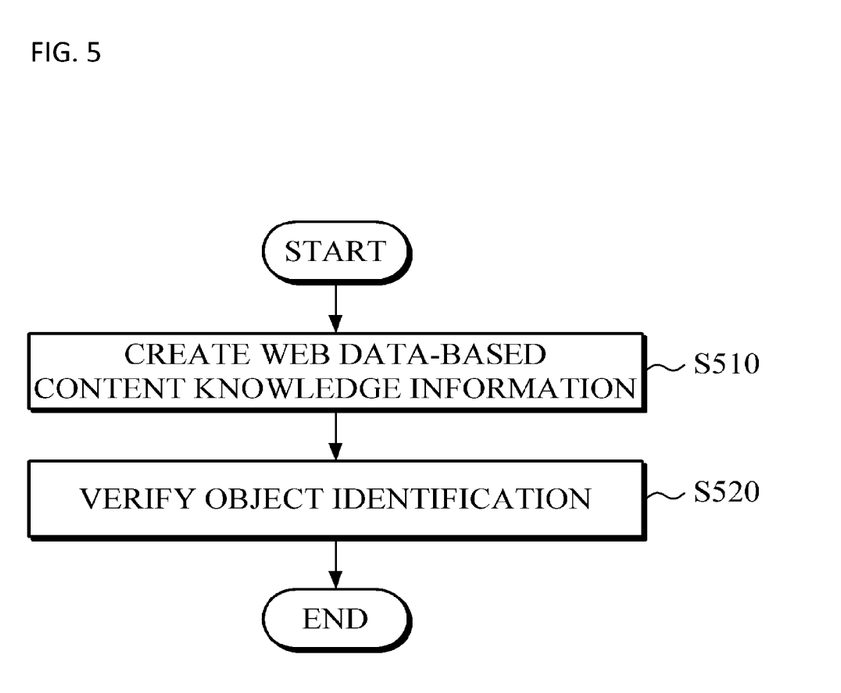
FIG. 5 is a flowchart illustrating a method for verifying identification of a broadcast content object, based on web data, according to an exemplary embodiment.

FIG. 5 is a flowchart illustrating a method for verifying identification of a broadcast content object, based on web data, according to an exemplary embodiment.

Referring to FIG. 5, the method for verifying identification of a broadcast content object based on web data mainly includes operations of: collecting and processing web data related to broadcast content and generating content knowledge information by tagging the broadcast content with the web data, as depicted in S510, and verifying identification of an object contained in the broadcast content by using the content knowledge information, as depicted in S520.

Figure 6:
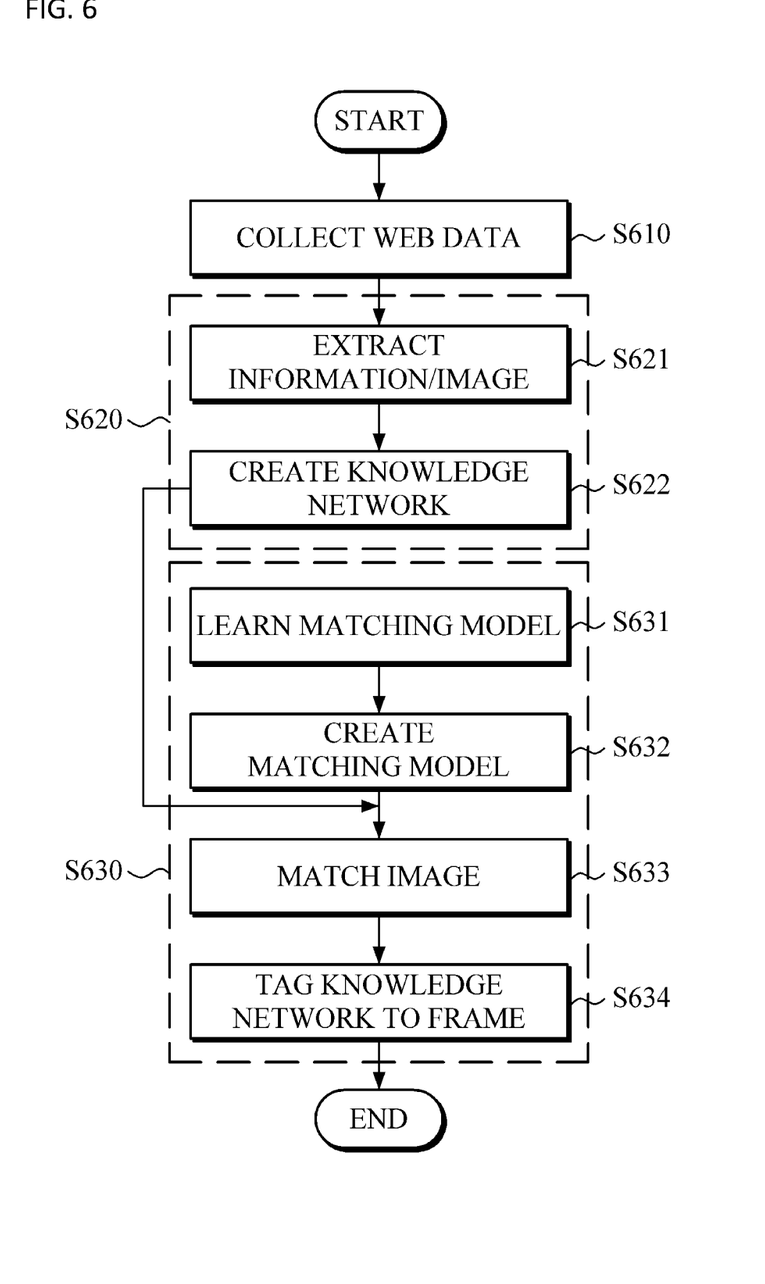
FIG. 6 is a flowchart illustrating the operation of generating content knowledge information by using web data according to the exemplary embodiment.

FIG. 6 is a flowchart illustrating the operation of generating content knowledge information using web data according to the exemplary embodiment.

Referring to FIG. 6 in conjunction with FIG. 1, the web data processor 110 collects the web data, as depicted in S610, constructs a knowledge network, as depicted in S620, and tags the knowledge network, as depicted in S630.

In S610, web data is collected using object-relevant keywords for the broadcast content. To this end, the web data collector 111 searches the broadcast content-associated glossary 11 in an external broadcast content DB to acquire keywords needed for collecting web data, accesses a web portal 30, and searches for and collects web data using the created query. Here, the object-relevant keywords may include, for example, the title of content, a main character's name, the name of vehicle shown as product placement (PPL), or the name of location.

In S620, a knowledge network consisting of at least one of images and terms extracted from the collected web data is constructed. Specifically, operation S620 includes extracting information/images, as depicted in S621, and constructing a knowledge network, as depicted in S622. In S621, terms and images are extracted from web data, i.e., web page. In S622, the knowledge network consisting of nodes that are the extracted terms and images is constructed.

In S630, the broadcast content image is searched to find a frame that contains an image which matches the image contained in the knowledge network, and the knowledge network is tagged to the found frame. Specifically, S630 includes learning a matching model, as depicted in S631, storing the matching model, as depicted in S632, matching the image, as depicted in S633, and tagging the knowledge network to the frame, as depicted in S634.

The matching model learner 113a is trained to achieve a matching model based on frames that form the broadcast content image 12 stored in the broadcast content DB, as depicted in S631, and the matching model creator 113b stores the trained matching model as depicted in S632.

In S633, the image matcher 113c matches n frames with respect to one web image, using the constructed knowledge network of S622 and the stored matching model of S632. Specifically, the image matcher 113c transforms feature vectors X into X', wherein the feature vectors X are extracted from the broadcast content frame or the web images using the matching model, and measures similarity between the transformed vectors. At this time, the transformation of the feature vectors is carried out in such a manner that the similarity between broadcast content frames satisfies Equation 3 below as much as possible.

$$\text{for } x,y,z \text{ in } X', \text{sim}(x',y') \le \text{sim}(x',z'), \text{ if } |(\#x-\#y)| \ge |(\#x-\#z)| \quad (3)$$

In Equation 3, sim( ) denotes a similarity calculation function, and #x denotes a frame number of x. The matching model that satisfies Equation 3 is learned in such a manner that the closer to each other the frames are, the more the similarity increases.

According to one exemplary embodiment, the image matcher re-computes ranks of feature vectors to match, using a different feature extraction method from the previous feature extraction method used to build the feature vectors X. For example, if color information is used to extract feature vectors X, information about texture or boundaries of the images are used in the post-processing to build feature vectors Y, and the similarity of the feature vectors is computed, whereby n candidate objects obtained from the matching model have their ranks re-adjusted. Various linear, non-linear model learning methods, such as SVMRank, manifold learning, and the like, may be applied to the establishment of matching model, and various feature extraction technologies may be used to extract features for the post-processing.

The tagger 113d selects one final frame with the highest score from among the n frames, tags the knowledge network to m frames preceding and following the final frame, and then assigns weights to the m frames based on their distance to the final frame, as depicted in S634.

Figure 7:
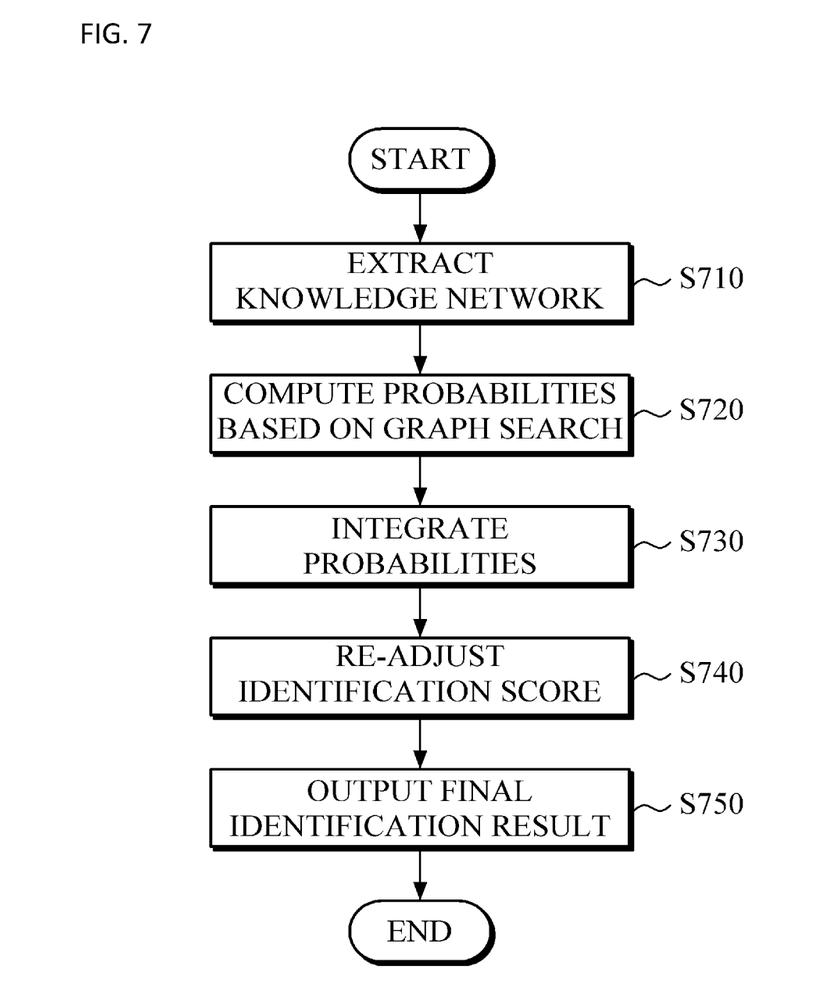
FIG. 7 is a flowchart illustrating an operation of object identification verification according to the exemplary embodiment.

FIG. 7 is a flowchart illustrating an operation of verifying object identification according to the exemplary embodiment.

Referring to FIG. 7, the operation of verifying object identification includes operations of: extracting a knowledge network as depicted in S710, computing probabilities based on graph search, as depicted in S720, integrating the probabilities as depicted in S730, re-adjusting the identification scores as depicted in S740, and outputting a final identification result as depicted in S750.

In response to receiving a result of object identification, the knowledge network extractor 131 requests the content knowledge information storage portion 120 to send a set of knowledge networks C'⊂C associated with the object-identified frame, and receives the set, as depicted in S710.

The graph search-based probability calculator 132 calculate the appearance probability of an object based on a group O of candidate objects for identification and the set C' if knowledge networks. With respect to an object o∈O to be identified, the appearance probability is calculated, as depicted in S720, using Equation 4 as below.

$$\sum_{c \in C'} p(o \mid c) = \sum_{c \in C'} p(o \mid g_c) \cdot p(\#f \mid t_c), \quad (4)$$

where #f denotes a frame number of the frame in which the object identification has been performed. The probability of an object o appearing in a knowledge network $g_c$ belonging to C' is multiplied with a weight of the frame #f in each knowledge network. Such multiplication is performed for all c∈C'.

The probability integrator 133 computes the probability of the object o by summing the appearance probabilities calculated by the graph search-based probability calculator 132, as depicted in S730.

The identification score re-adjuster 134 re-adjusts the result of object identification from the object identifier 20 using the obtained probability of the object o, and performs verification of the object identification, as depicted in S740, and outputs the final identification result, as depicted in S750.

As described above, the apparatus and method according to the above exemplary embodiments can increase object recognition performance with respect to broadcast content, and hence be applicable to object-oriented search, recommendation or mashup.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for verifying broadcast content object identification based on web data, the apparatus comprising:
   circuitry configured to
   collect and process web data related to broadcast content and create content knowledge information by tagging the web data to the broadcast content via a web data processor;
   store the content knowledge information via a content knowledge information storage portion; and
   verify a result of identifying an object contained in the broadcast content, using the content knowledge information via an object identification verifier,
   wherein the web data processor is configured to collect web data from a web portal based on a query using object-relevant keywords for the broadcast content and construct a knowledge network comprising at least one of images and terms extracted from the web data.

2. The apparatus of claim 1, wherein the web data processor comprises:
   a web data collector configured to create the query using the object-relevant keywords for the broadcast content, request the web portal to search for the web data based on the created query, and collect the found web data;
   a knowledge network constructor configured to construct the knowledge network comprising at least one of the images and the terms extracted from the collected web data; and
   a knowledge network tagger configured to tag the knowledge network to a specific frame of a broadcast content associated with the knowledge network.

3. The apparatus of claim 2, wherein the knowledge network comprises nodes that include at least one of the images and the terms, and connection edges between the nodes which are formed based on both importance of information that corresponds to each of the nodes and relevance between pieces of the information.

4. The apparatus of claim 2, wherein the knowledge network tagger tags an image, which has been extracted from the web data, to a frame of the broadcast content to be verified.

5. The apparatus of claim 4, wherein the knowledge network tagger is trained to achieve a matching model based on broadcast content frames and calculates ranks of images to match by measuring similarity between feature vectors which are extracted from the broadcast content frames or web images using the achieved matching model.

6. The apparatus of claim 5, wherein the knowledge network tagger re-calculates ranks for matching, using a feature extraction method that uses different features from those used in a feature extraction method employed to measure the similarity.

7. The apparatus of claim 5, wherein the knowledge network tagger selects one final frame of a highest score and tags the knowledge network to a predetermined number of frames preceding and following the selected final frame, and the predetermined number of frames have weights assigned thereto based on their distance to the final frame.

8. The apparatus of claim 1, wherein the content knowledge information storage portion stores, as content knowledge information, a set of knowledge networks and a set of frame numbers of the broadcast content tagged to a knowledge network.

9. The apparatus of claim 1, wherein the object identification verifier re-adjusts the result of identifying the object by calculating an appearance probability of the object based on a group of candidate objects for identification and a set of knowledge networks that are related to a frame which contains the identified object.

10. A method for verifying broadcast content object identification based on web data, the method comprising:
    collecting and processing web data related to broadcast content and creating content knowledge information by tagging the processed web data to the broadcast content; and
    verifying a result of identifying an object contained in the broadcast content, using the content knowledge information,
    where the creating of the content knowledge information comprises collecting web data from a web portal based on a query created using object-relevant keywords for the broadcast content and constructing a knowledge network comprising at least one of images and terms extracted from the web data.

11. The method of claim 10, wherein the creating of the content knowledge information comprises:
    creating the query using the object-relevant keywords for the broadcast content, requesting the web portal to search for the web data based on the created query, and collecting the found web data;

constructing the knowledge network comprising at least one of the images and the terms extracted from the collected web data; and tagging the knowledge network to a specific frame of a related broadcast content.

12. The method of claim 11, wherein the knowledge network comprises nodes that include at least one of the extracted images and the terms, and connection edges between the nodes which are formed based on both importance of information that corresponds to each of the nodes and relevance between pieces of the information.

13. The method of claim 11, wherein the tagging comprises:

learning a matching model based on broadcast content frames;

storing the learned matching model;

calculating ranks of images to match by measuring similarity between feature vectors which are extracted from the broadcast content frames or web images using the learned matching model; and tagging a knowledge network that contains the image to a corresponding frame according to the ranks of images for matching.

14. The method of claim 13, wherein in the calculating of the ranks of images, ranks of images for matching is re-calculated using a feature extraction method that uses different features from those used in a feature extraction method employed to measure the similarity.

15. The method of claim 13, wherein in the tagging of the knowledge network, one final frame of a highest score is selected, the knowledge network is tagged to a predetermined number of frames preceding and following the selected final frame, and the predetermined number of frames have weights assigned thereto based on their distance to the final frame.

16. The method of claim 10, wherein in the verification of the result of identifying the object, the result is re-adjusted by calculating an appearance probability of the object based on a group of candidate objects for identification and a set of knowledge networks that are related to a frame which contains the identified object.

* * * * *